H. B. ROSS, B. D. STEVENS & J. P. GATES.
FEEDING MECHANISM FOR SAWS.
APPLICATION FILED DEC. 2, 1907.
931,223.
Patented Aug. 17, 1909.
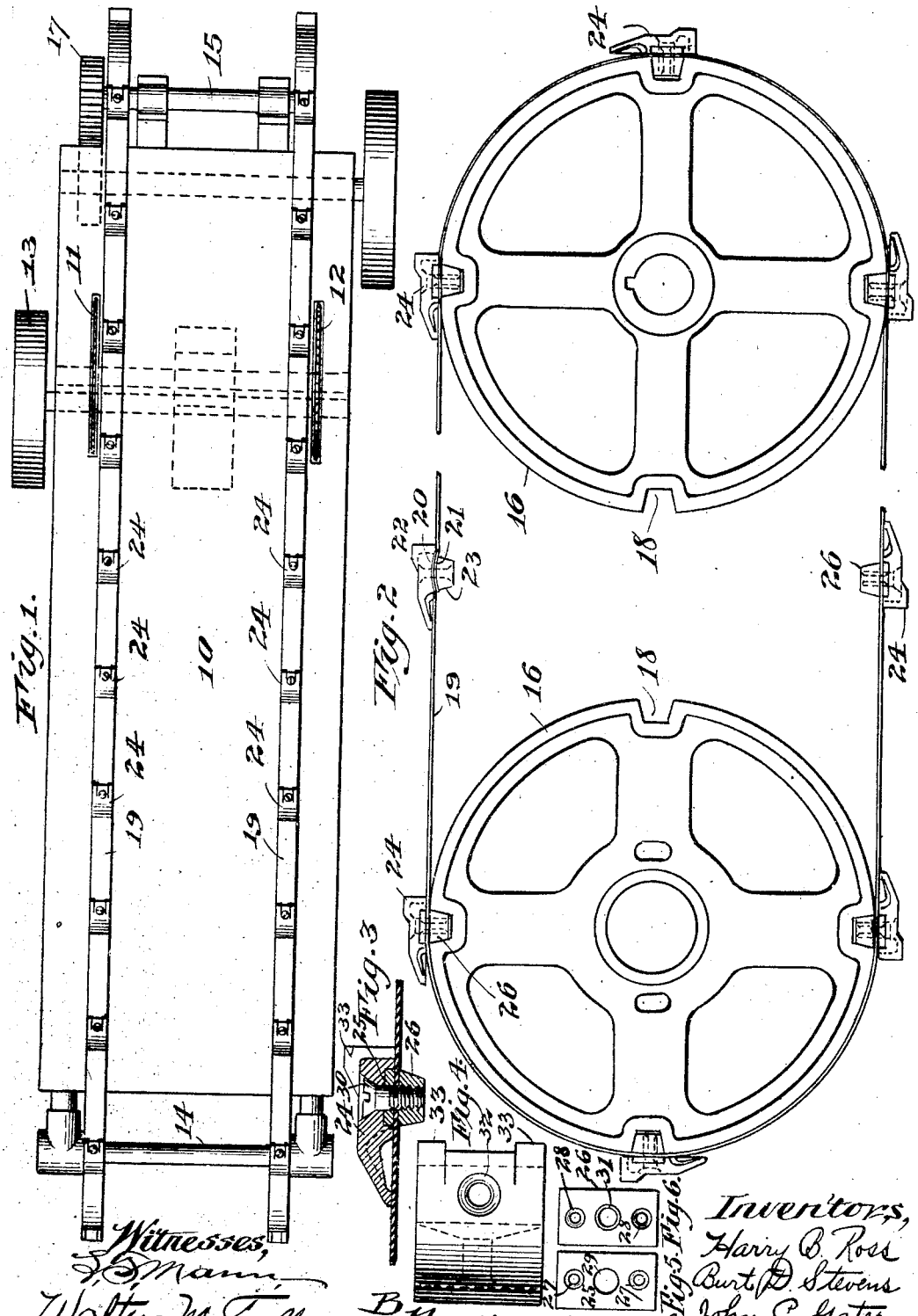

UNITED STATES PATENT OFFICE.

HARRY B. ROSS, BURT D. STEVENS, AND JOHN P. GATES, OF BELOIT, WISCONSIN, ASSIGNORS TO THE BERLIN MACHINE WORKS, OF BELOIT, WISCONSIN, A CORPORATION OF WISCONSIN.

FEEDING MECHANISM FOR SAWS.

No. 931,223.          Specification of Letters Patent.          Patented Aug. 17, 1909.

Application filed December 2, 1907. Serial No. 404,877.

*To all whom it may concern:*

Be it known that we, HARRY B. ROSS, BURT D. STEVENS, and JOHN P. GATES, citizens of the United States, all residing at Beloit, in the county of Rock and State of Wisconsin, have jointly invented certain new and useful Improvements in Feeding Mechanism for Saws, of which the following is a specification.

Although our present invention is illustrated on the accompanying drawing, forming a part of this specification, and described herein in connection with wood sawing machines, it is not limited to such use or application, even though particularly valuable in that relation, but it is applicable for many uses, especially where exactly-timed travel of a part is necessary or accurately-timed actuating mechanism of any kind is desirable.

In double cut-off saws it has been usual to employ a feeding mechanism consisting of a pair of chains passing around sprocket wheels and having conveyer blocks or flights attached thereto at intervals and to corresponding links of the pair of sprocket chains, to feed or push the boards forwardly to the companion cut-off saws. Use of these machines has shown and demonstrated that the hinge pins or links of the chains not only become worn but that they wear unevenly, destroying the alinement of the pushing or feeding blocks or abutments, and causing improper and untrue sawing of the boards. To overcome this difficulty we have devised a feeding mechanism of the same general character as that outlined above but in which endless steel bands, which cannot stretch, take the place of the objectionable chains.

Other features of novelty and value of the invention will become apparent from the following detailed description of the embodiment of our invention in double cut-off saws.

On the accompanying drawing—Figure 1 is a plan view of such a saw; Fig. 2 illustrates in side elevation our improved feeding mechanism for advancing the boards to the saws; Fig. 3 is a central longitudinal section through a portion of the steel band and blocks fastened thereto; Fig. 4 is a plan view of one of the flights or conveyer blocks for the boards; Fig. 5 is a plan view of one of the intermediate blocks or pieces located between the flight or conveyer block and the outer face of the metallic band; and Fig. 6 is a plan view of one of the blocks or teeth fastened to the inner face of the metallic band or strap.

Referring to the drawing, it will be noticed that the double cut-off saw has a base or bed 10, a pair of revoluble circular saws 11 and 12 mounted on a shaft rotated by means of a driving pulley 13. At the two ends of the machine and rotatable in suitable bearings are the two shafts 14 and 15 on each of which is mounted a pair of wheels or pulleys 16 of the type indicated in Fig. 2. The shaft 15 may be rotated or driven by any suitable power-conveying means, as for example the gear 17 fastened to one end thereof. The wheels 16 on the shaft 15 are keyed thereto so that they constitute the driving means for the board conveying and advancing metallic bands described below, while the wheels 16 on the shaft 14 may rotate loosely on the shaft or may be fixed to the shaft which revolves in bearings provided therefor. The circular periphery of each of the wheels 16 is notched or grooved to provide a number of tapered recesses 18. The wheels 16 on the shafts 14 and 15 are arranged in alinement, and passing around each pair is a tempered spring steel band or belt 19, the two overlapped ends 20 and 21 of each of which are clamped between the inner concave surface of a flight or conveyer block 22 on the outer face of the overlapping ends, and the convex inner surface of a tapered tooth or block 23 located on the inner surface of the overlapped ends, the two blocks 22 and 23 being riveted together, whereby the two ends of the band 19 are securely fastened together and crimped or curved between the two blocks to secure a firmer and stronger connection. The block or tooth 23 is shaped to conform substantially exactly to the shape of the recesses 18 of the wheels 16 and is adapted to enter one of these recesses as the band passes around one of the wheels.

The endless metallic band or belt 19 has in addition to the coupling or uniting blocks 22 and 23 a plurality of spaced flights or conveying pieces or blocks 24 located on the outer face of the belt or band 19 as is the block 22. Opposite each conveying block or flight 24, located on the inner face of the metallic band 19, and riveted to an intermediate piece 25 on the outer face of the band and between the flight 24 and the outer surface of the band is a tapered tooth 26 in shape substantially like the tooth 23 described above. The intermediate piece 25 has a pair of holes 27 therethrough, while the tooth or block 26 has similar holes 28 therethrough to accommodate and receive a pair of rivets which pass through similar apertures in the band 19 and hold the two parts 25 and 26 securely together and fasten them fixedly to the band or belt. The intermediate piece 25 is also centrally apertured at 29 for the reception of a fastening screw 30 which engages the threads of a centrally located screw-threaded aperture 31 in the tooth 26, its conical head being accommodated in a similarly-shaped recess or hole 32 in the block or flight 24. As is clearly indicated in Figs. 3 and 4, each flight or conveying block has on its front face a pair of forwardly-extended projections 33 adapted to bear against the rear edge of the board or piece, being advanced thereby to the revolving circular saws. As is clearly illustrated, the blocks or teeth 26 are shaped to conform substantially to the recesses 18 and are spaced apart on the band 19 so that they will accurately enter the grooves or openings 18 provided for their accommodation. Each tooth 26 forms a backing for the attachment of its companion flight or conveyer block, and also acts in coöperation with the recesses 18 to maintain unvarying alinement of the blocks on the two parallel metallic bands or strips 19. These endless bands are driven not only by the friction between the bands and the driving wheels or pulleys, but also by the co-action between the teeth on the inner face of the band and the grooves or recesses on the wheels. There is practically no stretch to metallic bands 19 of the character indicated so that accurate and true sawing off of the ends of the boards may be accomplished by the employment of a mechanism of the character herein set forth.

As previously stated, a mechanism of this character may be used in various devices and in many relations to accomplish a diversity of results, and it is especially adapted for use in a machine of any kind where accurate feeding or timing of the actuation of any part is required, since the flights 24 or even the teeth 23 and 26 may be used for the accomplishment of a result quite different from that of feeding boards to a double cut-off saw.

Various minor mechanical changes may be made in the construction herein described and illustrated without departure from the substance or spirit of our invention or sacrificing its benefits and advantages.

Although we have shown and described a pair of bands with attached blocks feeding the boards to the saws, it is obvious that a single band or more than two such bands may be employed, if desired. Furthermore, although we have shown a flight or conveyer block attached to each of the teeth, any number of these blocks may be omitted if preferred, but it will be readily understood, however, that the recesses 18 on the periphery of the wheels will have to be so spaced as to accommodate the teeth or blocks on the inner faces of the bands or belts.

We claim:

In a feeding mechanism for saws, the combination of a pair of saws, two pairs of rotatable wheels or pulleys each having one or more recesses or grooves on its periphery, a pair of endless metallic bands passed around said wheels or pulleys, a plurality of blocks or teeth on the inner surface of each of said bands adapted to enter the recesses of said wheels or pulleys during the rotation of the latter, a flight or conveyer block on the outer face of each band opposite each of said blocks or teeth, means to fasten said flights or conveyer blocks to the inner blocks or teeth, the ends of each of said metallic bands being overlapped, a conveyer block having a curved face resting on a surface of each pair of said overlapped ends, a second block or tooth adapted to enter the recesses or grooves of said wheels or pulleys and having a curved face bearing against the opposite surface of said overlapped ends, and means to fasten said blocks together to clamp said bands together, the latter being crimped between the curved faces of said blocks, substantially as described.

HARRY B. ROSS.
BURT D. STEVENS.
JOHN P. GATES.

Witnesses to the signatures of Harry B. Ross and Burt D. Stevens:
F. L. LANE,
J. A. THORSON.

Witnesses to the signature of John P. Gates:
L. M. RANDALL,
W. R. PERKINS.